(12) United States Patent (10) Patent No.: US 9,338,802 B2
LeCompte (45) Date of Patent: May 10, 2016

(54) METHOD FOR ACCELERATING THE ACTIVATION OF A MBMS SERVICE

(71) Applicant: LENOVO INNOVATIONS LIMITED (HONG KONG), Quarry Bay (HK)

(72) Inventor: David LeCompte, Maisons-Alfort (FR)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 133 days.

(21) Appl. No.: 13/886,961

(22) Filed: May 3, 2013

(65) Prior Publication Data

US 2013/0242850 A1 Sep. 19, 2013

Related U.S. Application Data

(62) Division of application No. 12/933,049, filed as application No. PCT/JP2009/055720 on Mar. 17, 2009, now abandoned.

(30) Foreign Application Priority Data

Mar. 17, 2008 (EP) ..................... 08102666

(51) Int. Cl.
*H04L 29/06* (2006.01)
*H04W 76/00* (2009.01)
*H04W 28/06* (2009.01)
*H04W 76/02* (2009.01)

(52) U.S. Cl.
CPC ............. *H04W 76/002* (2013.01); *H04L 69/22* (2013.01); *H04W 28/06* (2013.01); *H04W 76/02* (2013.01)

(58) Field of Classification Search
None
See application file for complete search history.

(56) References Cited

U.S. PATENT DOCUMENTS

| 6,788,675 | B1 | 9/2004 | Yang | |
|---|---|---|---|---|
| 2005/0043035 | A1* | 2/2005 | Diesen et al. | 455/454 |
| 2008/0317052 | A1* | 12/2008 | Cai | 370/401 |

FOREIGN PATENT DOCUMENTS

| CN | 1839590 A | 9/2006 |
|---|---|---|
| JP | 2003-500933 A | 1/2003 |
| JP | 2004-312750 A | 11/2004 |
| JP | 2005-229608 A | 8/2005 |
| JP | 2007-503154 A | 2/2007 |
| JP | 2007-508783 A | 4/2007 |
| JP | 2007-508793 A | 4/2007 |
| JP | 2007-221797 A | 8/2007 |
| WO | 2004/017540 A1 | 2/2004 |
| WO | 2004/017577 A1 | 2/2004 |
| WO | 2004/100400 A1 | 11/2004 |

(Continued)

OTHER PUBLICATIONS

Communication, dated May 21, 2013, issued by the Japanese Patent Office in counterpart Japanese Patent Application No. 2012-535142.
Communication, dated Apr. 7, 2013, issued by the State Intellectual Property Office of P.R. China in counterpart Chinese Patent Application No. 200980109557.6.

(Continued)

*Primary Examiner* — Raj Jain

(57) ABSTRACT

The invention relates to a method for accelerating the activation of a MBMS service distributed by a service provider to a plurality of user equipments UEs in the form of MBMS data packets, MBMS data packet, comprising each, compressed header information and a payload, characterized by: —creating a specific MBMS service data flow containing only header information, —transmitting said specific MBMS service data flow to the UE separately from said MBMS data packets.

8 Claims, 8 Drawing Sheets

(56) References Cited

FOREIGN PATENT DOCUMENTS

| WO | 2005/022835 | A1 | 3/2005 |
| WO | 2005/039186 | A1 | 4/2005 |
| WO | 2006/104342 | A2 | 10/2006 |
| WO | 2006/104346 | A1 | 10/2006 |

OTHER PUBLICATIONS

Communication dated Jan. 14, 2014, issued by the Japanese Patent Office in corresponding Application No. 2013-138556.

* cited by examiner

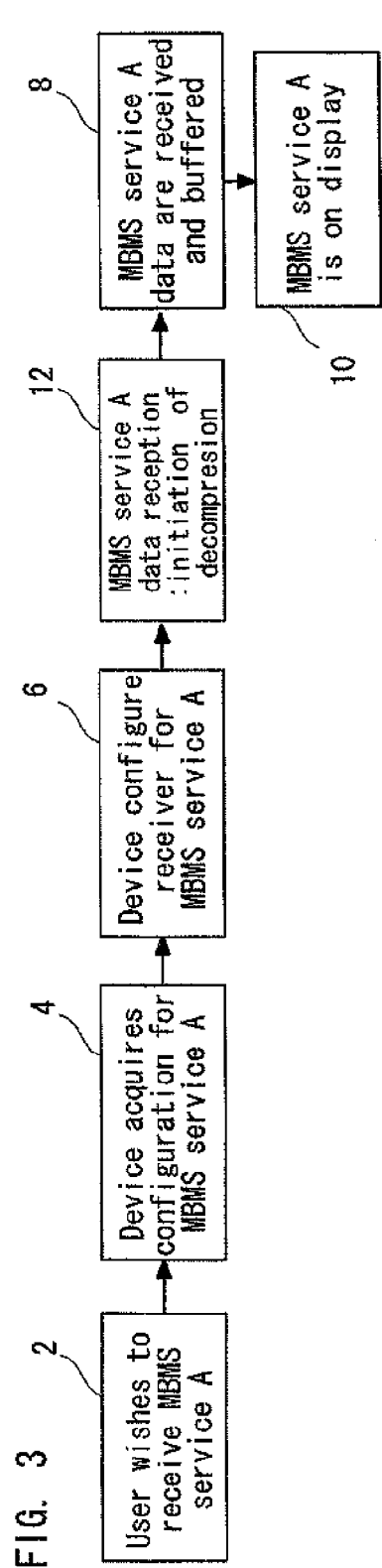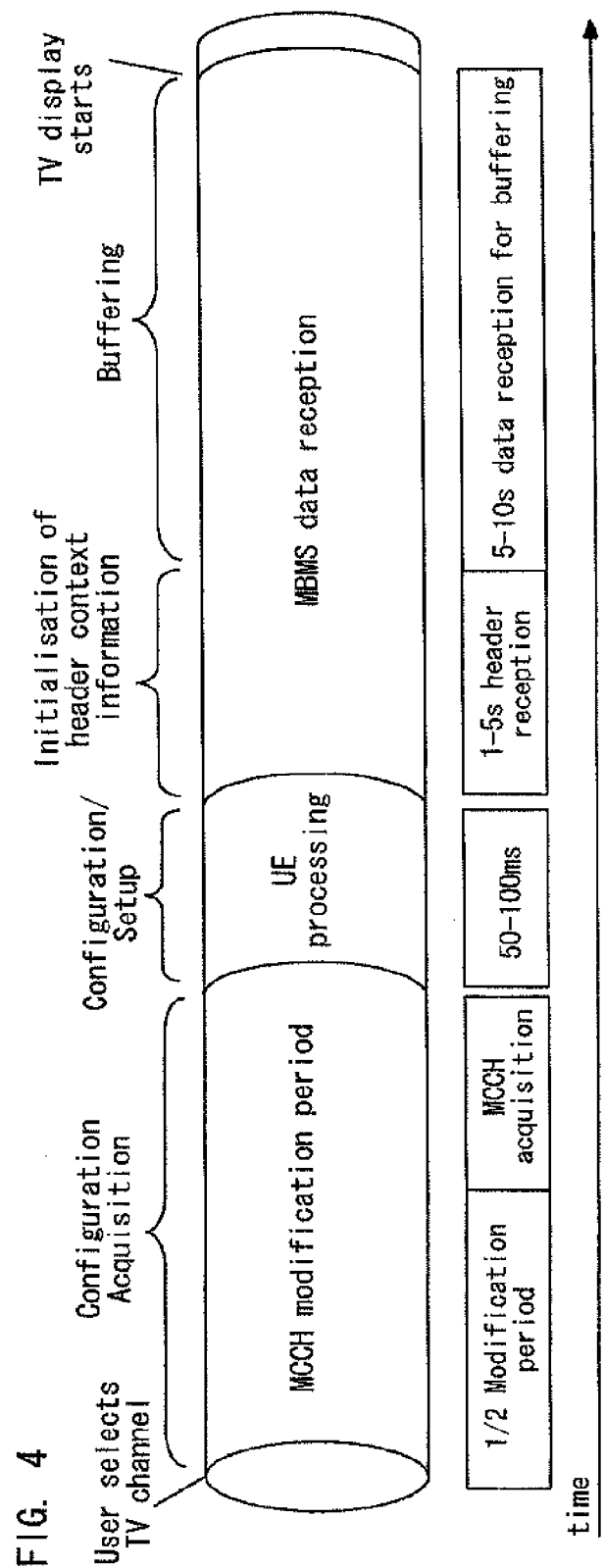

METHOD FOR ACCELERATING THE ACTIVATION OF A MBMS SERVICE

CROSS REFERENCE TO RELATED APPLICATIONS

This is a divisional application based upon U.S. patent application Ser. No. 12/933,049 filed Sep. 16, 2010, which is a National Stage of International Application No. PCT/JP2009/055720 filed Mar. 17, 2009, claiming priority based on European Patent Application No. 08102666.8 filed Mar. 17, 2008, the contents of all of which are incorporated herein by reference in their entirety.

TECHNICAL DOMAIN

The invention pertains to telecommunication field and concerns a method for accelerating the activation of a Multimedia Broadcast Multicast Service (MBMS) distributed by a service provider to a plurality of user equipments (UEs) in the form of MBMS data packets, comprising each, compressed header information and a payload.

The invention concerns also a User Equipment adapted for receiving such MBMS services and a Server adapted for distributing such MBMS services.

STATE OF PRIOR ART

Multimedia Broadcast Multicast Service (MBMS) is a broadcasting service that can be offered via existing GSM and UMTS cellular networks. The infrastructure offers an option to use an uplink channel for interaction between the service and the user, which is not provided in usual broadcast networks, as for example conventional digital television which is only a one-way (unidirectional) system. MBMS uses multicast distribution in the core network instead of point-to-point links for each end device.

It is expected that MBMS will be rolled out in cellular networks and gives the opportunity to broadcast TV, film, information and other media in these networks. MBMS has the major benefits that the network infrastructure is already there for mobile network operators and the deployment can be cost effective compared with building a new network for the services. The broadcast capability enables to reach unlimited number of users with constant network load. Further, it also enables the possibility to broadcast information simultaneously to many cellular subscribers for example emergency alerts.

The MBMS feature is split into the MBMS Bearer Service and the MBMS User Service. The MBMS Bearer Service includes a Multicast- and a Broadcast Mode. The MBMS Bearer Service uses IP Multicast addresses for the IP flows. The advantage of the MBMS Bearer Service compared to legacy UMTS bearer services (interactive, streaming, etc) is, that the transmission resources in the core- and radio network are shared. One MBMS packet flow is replicated by GGSN, SGSN and RNCs. MBMS may use an advanced counting scheme to decide, whether or not zero, one or more dedicated (i.e. unicast) radio channels lead to a more efficient system usage than one common (i.e. broadcast) radio channel.

The MBMS User Service is basically the MBMS Service Layer and offers a Streaming and a Download Delivery Method. The Streaming Delivery method can be used for continuous transmissions like Mobile TV services. The Download Method is intended for "Download and Play" services.

One problem in the reception of MBMS service when header compression techniques are used for the MBMS data is generated by the delay introduced by header compression when a user of a MBMS reception device activates a service.

As a matter of fact, when a user initiates reception of an MBMS transmission on its MBMS reception device, e.g. a TV channel, there is some delay before the service becomes available to the user, e.g. before the service is displayed on the screen, due to initial buffering in the codec layers.

In addition, because of the header compression applied to the headers of the MBMS data packets (e.g. RTP/IP headers), there is an additional delay until the headers can be successfully decompressed and the MBMS data can be provided to the codec layers. Successful decompression of the headers for a flow of MBMS data is only possible after one or more date packets containing full header information is received, while such packets may be transmitted only infrequently, e.g. every 5 or 10 s.

The delay introduced by header compression is the time until one or more MBMS data packets are transmitted with full header information. Such transmission typically occurs in a periodic manner, or when there is a change, which is a rather infrequent event. While it is possible for the header compression entity to increase the frequency of transmission, this decreases the gain of header compression.

An object of the invention is to eliminate this delay without decreasing the gain of header compression.

PRESENTATION OF THE INVENTION

The object of the invention is achieved by a method for accelerating the activation of a MBMS service distributed by a service provider to a plurality of user equipments UEs in the form of MBMS data packets, comprising each, compressed header information and a payload representing the service such as video and/or audio data streams.

The method according to the invention comprises the following steps:
  creating a specific MBMS service data flow containing only header information,
  transmitting said specific MBMS service data flow to the UE separately from said MBMS data packets.

In a first embodiment of the method according to the invention, said specific MBMS service data flow is transmitted to the UEs over a MBMS Traffic Channel (MTCH).

In a second embodiment of the method according to the invention, said specific MBMS service data flow is transmitted to the UEs over a MBMS Control Channel (MCCH).

In both embodiments, The UEs receiving the MBMS services are configured to continuously read and maintain exhaustive header information for a set of MBMS services by receiving MCCH or the specific MBMS services carrying only header information.

Thanks to this feature, there is no delay due to header compression when the user wishes to receive such a service.

The identity of the MBMS service containing the only header information is indicated either:
  in the service announcement for the MBMS service containing the payload. This information is provided by the BMSC, in case of MBMS UTRAN/GERAN architecture, provided by the MBMS Gateway in case of E-UTRAN)
  in the MCCH control information related to the MBMS service containing the real data. This information is provided by the RNC/BSC/MCE or eNB in case of MBMS UTRAN/GERAN/E-UTRAN architecture.

Preferably, said specific MBMS service data flow is transmitted to the UEs with scheduling information indicating the occurrence date of the next transmissions of a service on MTCH in order to stop reception in-between.

In an alternative variant, said specific MBMS service data flow is transmitted to the UEs with reference periods of the MCCH for notifying the change of the information related to a specific MBMS service data flow compared with the previous reference period.

It is then possible to make the power consumption really low while maintaining up to date information for several MBMS services.

It is to be noted that, the continuous reception of the MCCH or the specific MBMS services carrying only header information causes additional power consumption for the UEs. However, it is possible to arrange the transmission of the header information in a way that takes advantage of all the existing power saving techniques applied to reception of an MBMS Traffic Channel or of the MBMS Control Channel such as:

scheduling information (e.g. called MSCH, Scheduling Block, dynamic scheduling information or whatsoever) that indicates when the next transmissions of a service on MTCH may occur so the receiving device may stop reception in-between, reference periods (called "Modification Periods") of the MCCH with notifications when the information related to a MBMS is changed compared with the previous reference period, using either or both an MBMS Indicator Channel (MICH) which the UE can monitor instead of MCCH;

an arrangement of MBMS control information on MCCH where control information (e.g. MBMS MODIFIED SERVICES INFORMATION message) is transmitted as the start of each reference period and includes the list of MBMS services for which modified information will be transmitted.

Furthermore, the header information may change after it was last transmitted on MCCH or MTCH separately from the MBMS data. In this case, when it starts reception of an MBMS service, the UEs may be using outdated header information. In the worst case, this may confuse the header decompression entity in the MBMS reception device, cause incorrect data to be transmitted to the codec layers, and possibly lead to e.g. confused video stream or unpleasant sounds to be played.

In order to avoid such consequences, a piece of information is included together with MBMS data packets on MTGH which allows the MBMS reception device to know that a change occurred since it was last transmitted in one of the two ways mentioned above. This piece of information can be.

one single-bit indicated the MBMS device should not rely on the previously stored header information acquired from the separate MTCH or from MCCH a value tag increased by one at each change, included with the MBMS data information and with the separate header information for this MBMS service, so that the UEs may check if it has an up to date value and discard the data if not.

This single-bit or value tag may be transmitted using certain bits in the MAC, or the RLC of the PDCP header of the MBMS data packets, or a special field if transmitted on MCCH either:

with each MBMS data packet transmitted on the MTCH carrying the data with compressed headers, or, with each MBMS packet containing header information on the associated MTCH, or header information on MCCH.

The User Equipment intended to receive the MBMS service comprises means for receiving specific MBMS service data flow containing only header information transmitted separately from said MBMS data packets.

Said UEs are configured for acquiring and maintaining the header information for several MBMS services while not receiving said MBMS services.

The server distributing said MBMS services comprises:

means for creating a specific MBMS service data flow containing only header information, means for transmitting said specific MBMS service data flow to the UEs separately from said MBMS data packets.

BRIEF DESCRIPTION OF THE FIGURE

Other features and advantages of the invention will appear from the following description taken as a non limiting example with reference to the following drawings in which;

FIG. 3 illustrates sequential operations of an MBMS reception device of the prior art with header compression, FIG. 4 illustrates the delay between the first and the last step of sequential operations of FIG. 3.

DESCRIPTION OF A DETAILED EMBODIMENT
OF THE INVENTION

Figure 1:
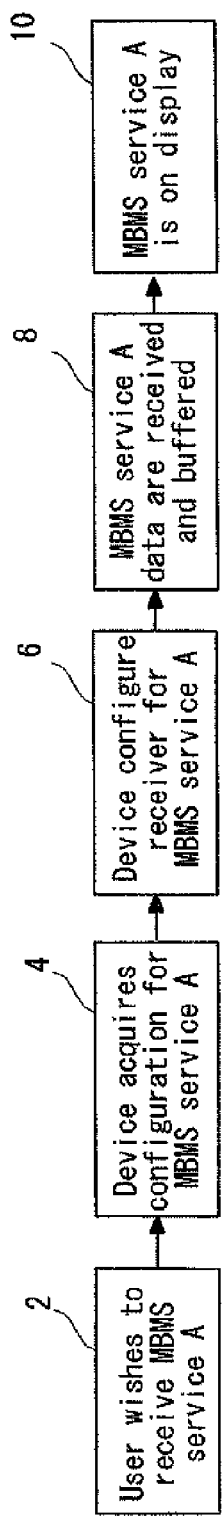
FIG. 1 illustrates sequential operations of an MBMS reception device of the prior art without header compression.

FIG. 1 illustrates the fully sequential operation of a User Equipment device (or the operation of an User Equipment device upon startup) for receiving a MBMS video program without header compression.

At step 2, the UE selects the broadcasting channel of said MBMS video program. At step 4, the UE acquires the configuration for receiving said MBMS video program. Step 6 The UE device configures the reception module for receiving said video program. At step 8, the video program is received and buffered, and displayed to step 10.

Figure 2:
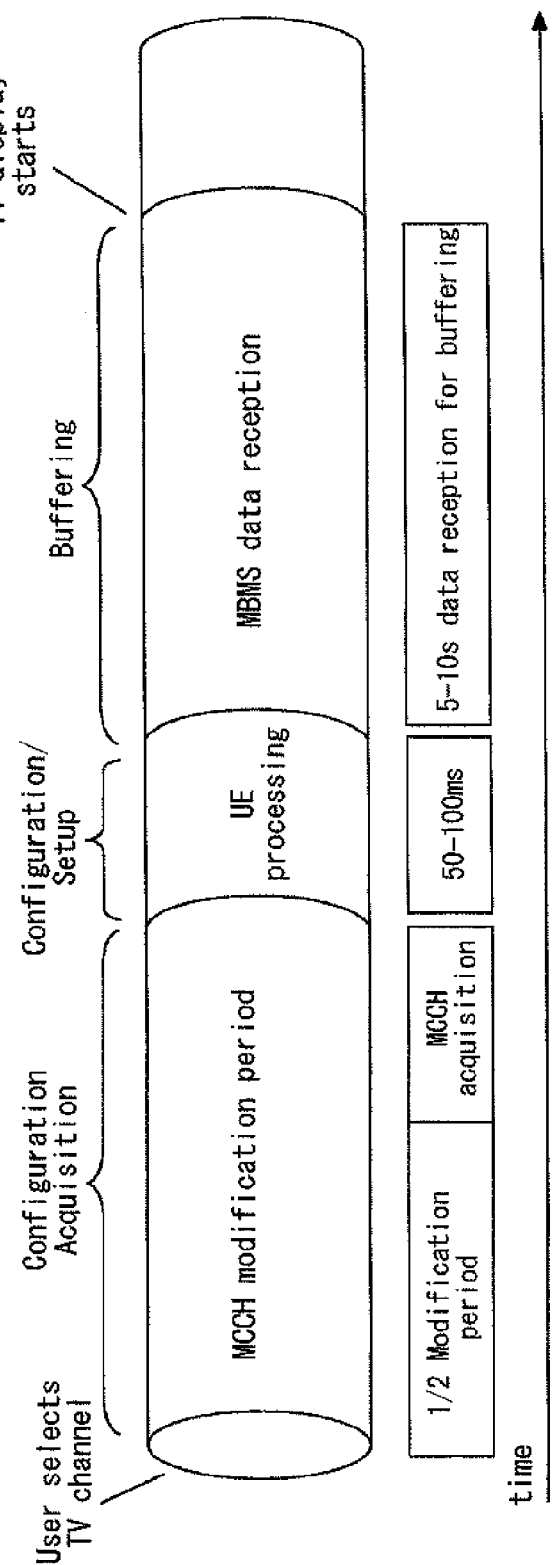
FIG. 2 illustrates the delay between the first and the last step of sequential operations of FIG. 1.

The delay between the first step 2 and the last step 10 is illustrated by FIG. 2.

Steps 2 and 4 respectively use ½ modification period and the delay for receiving control information transmitted as the start of each reference periods (called "Modification Periods") of a MCCH channel (for MBMS MODIFIED channel) indicating when the information related to a MBMS is changed compared with the previous reference period.

The duration of step 6 is between 50 ms and 100 ms.

The buffering step 8 necessitates 5 ms to 10 ms.

Referring now to FIG. 3, the fully sequential operation of a User Equipment device (or the operation of an User Equipment device upon startup) for receiving a MBMS video program with header compression further comprises step 12 consisting in the initiation of the MBMS video program decompression. The delay between the first step 2 and step 10, before displaying the video program, is identical to the one of FIG. 2. However, 1 second to 5 seconds are added to the delay at the reception stage due to the decompression step 12 of header information before the buffering step 8.

It appears that when header compression is used, because header information is only transmitted infrequently, e.g. every 1 s to 5 s, there is an additional delay in the total time.

Figure 5:
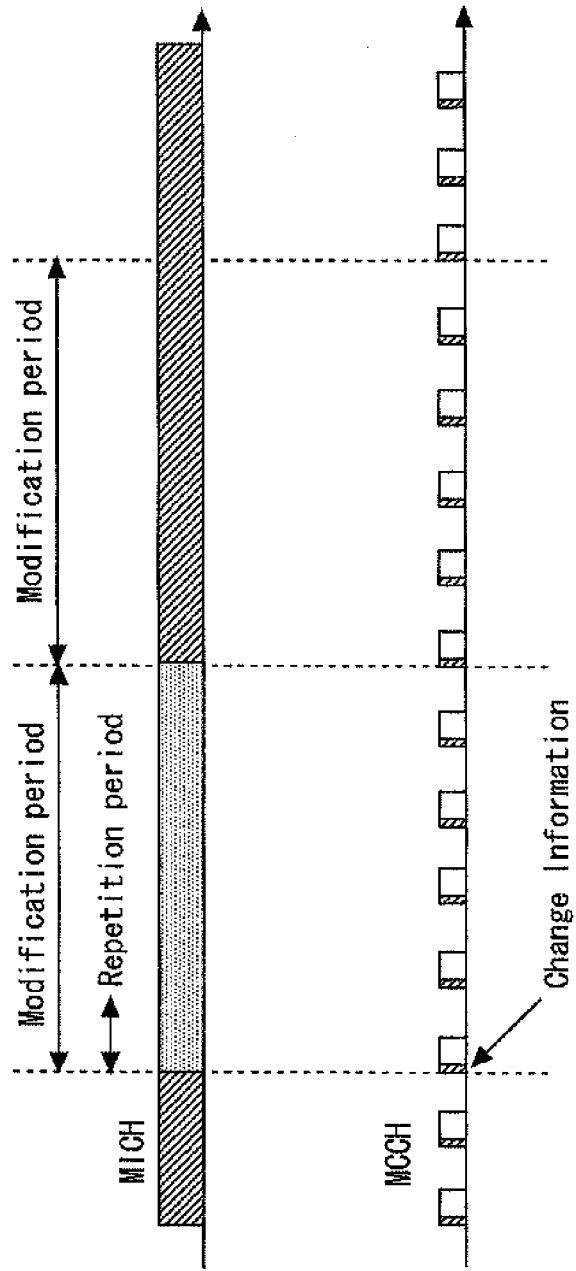
FIG. 5 illustrates an example of existing power saving techniques for acquisition of MCCH information.

However, the method according to the invention implements the already existing techniques, in order to acquire and maintain configuration for several MBMS channels simultaneously with the reception of a MBMS channel, or even while not actually receiving any of them. This is possible thanks to the arrangement of transmission as illustrated in FIG. 5 where on MCCH, the "change information" indicates whether any change in the configuration information occurred since the last modification period. Once the UE reception device has read the "change information", if it indicates a change, it goes on receiving MCCH; otherwise, it stops reception of MCCH until the next modification period.

Figure 6:
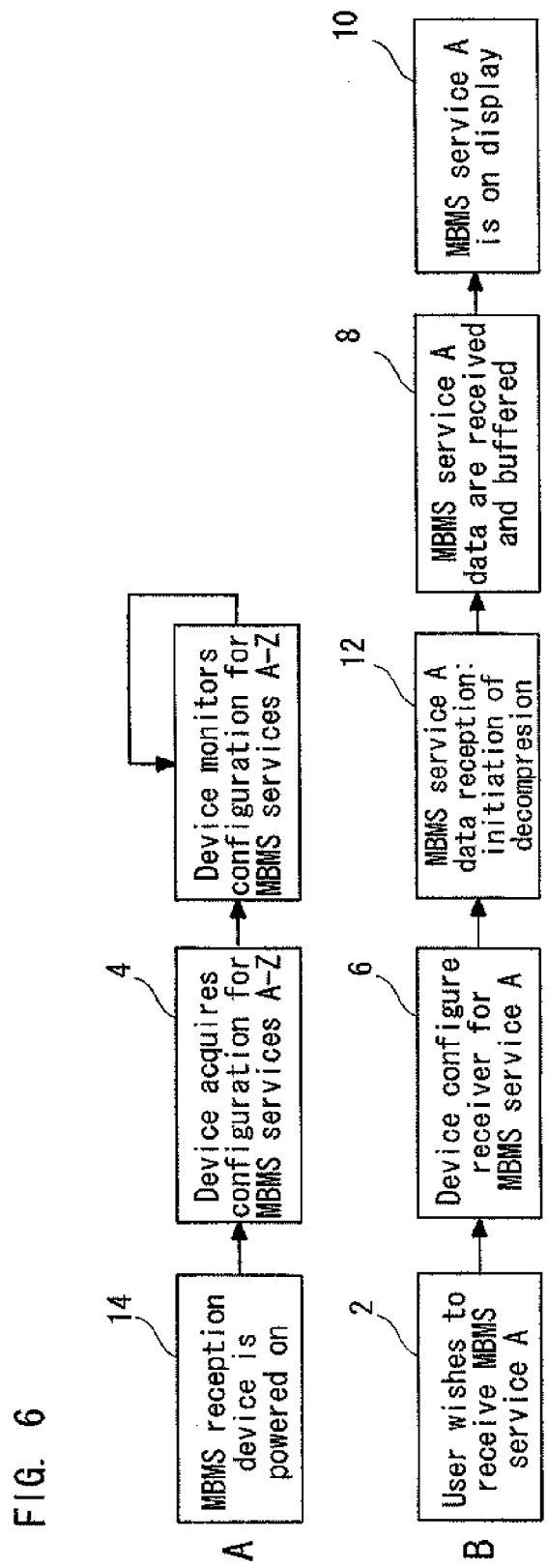
FIG. 6 illustrates sequential operations of an MBMS reception device according to a first embodiment of the invention using an example of power saving techniques for acquisition of MCCH information.

In this case, two processes A and B are executed in parallel as represented in FIG. 6.

Process A comprises the following steps:
powering on of the Ue reception device (step 14),
acquiring the configuration for the MBMS services (step 4),
monitoring the configuration for the MBMS services (step 16).

Figure 7:
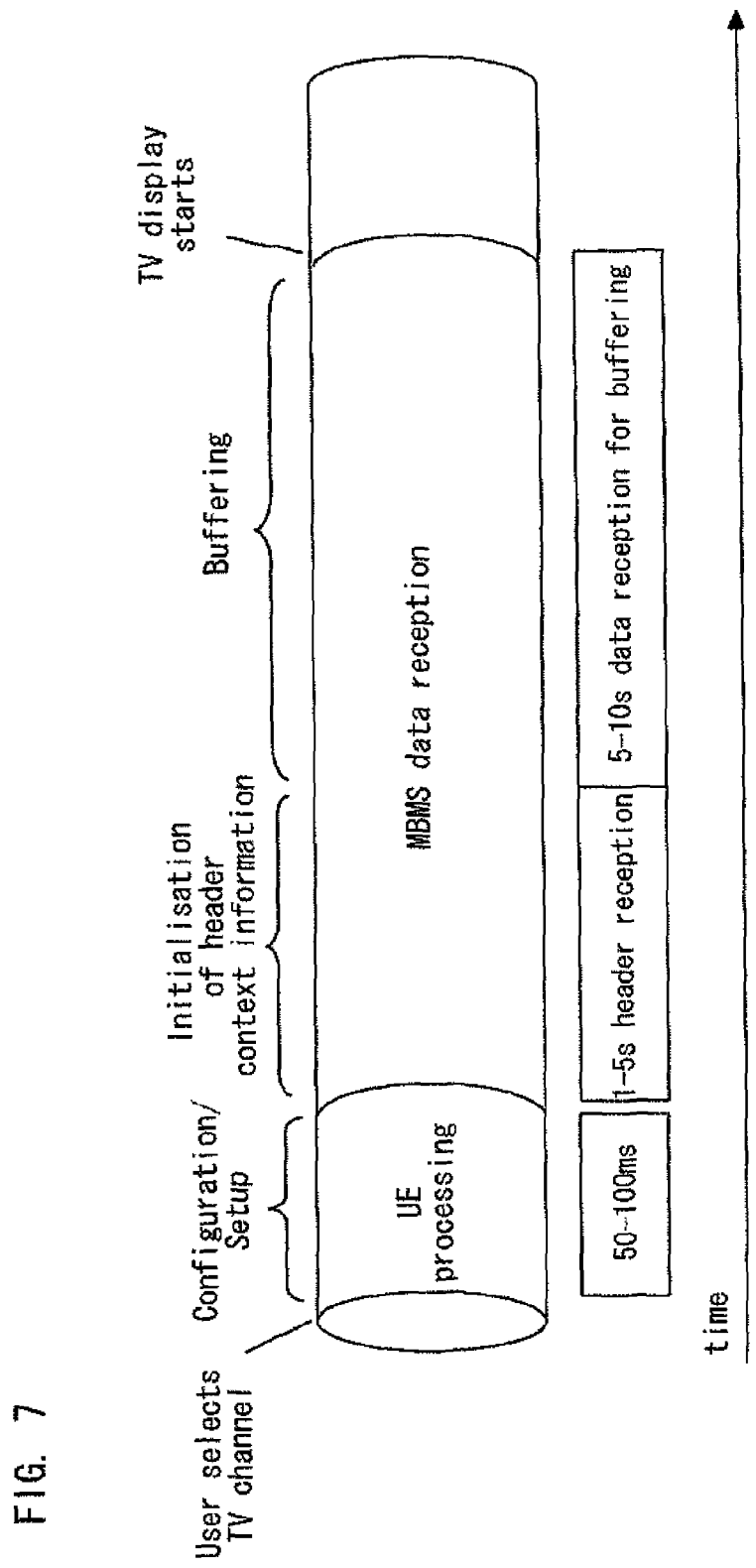
FIG. 7 illustrates the delay between the first and the last step of sequential operations of FIG. 6.

Process B comprises the following steps:
requesting by the user a particular MBMS service (e.g. a specific MBMS video program) (step 2),
configuring the reception module of the UE for said particular MBMS service (step 6),
initiation of header decompression (step 12),
buffering received MBMS services (step 8).
displaying the buffered MBMS services (step 10), The total delay for these two processes until the displaying step of the requested MBMS service is illustrated by FIG. 7 where it can be seen that, before the MBMS date reception, the configuration of the UE take 50 milliseconds to 100 milliseconds, and at the MBMS data reception step, the initialisation of the header context information and the buffering respectively take 1 ms to 5 ms and 5 ms to 10 ms.

Figure 8:
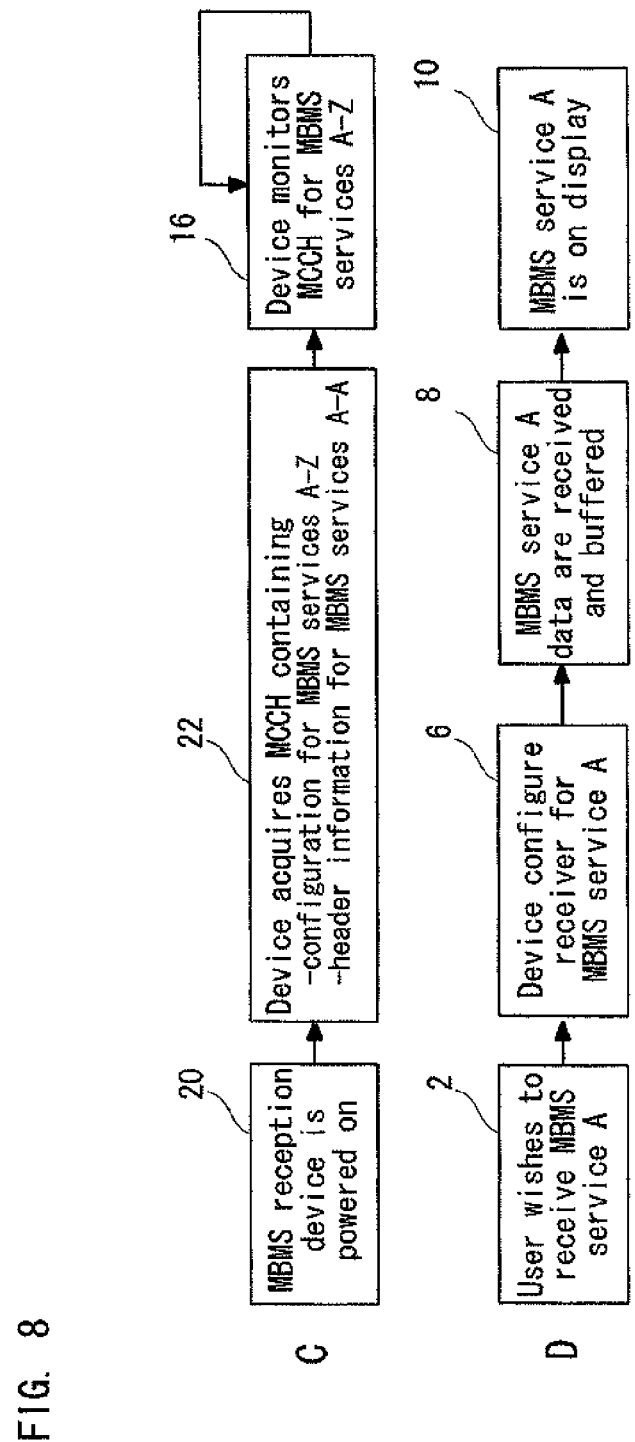
FIG. 8 illustrates sequential operations of an MBMS reception device according to a second embodiment of the invention, FIG. 9 the delay between the first and the last step of sequential operations of FIG. 8.

FIG. 8 illustrates an embodiment of the invention according to which the header information is included in the MCCH, together with configuration information, so that the MBMS reception device can acquire this information for all MBMS services In this case, two processes C and D are executed in parallel as represented in FIG. 8.

Process C comprises the following steps:
powering on of the Ue reception device (step 20),
acquiring the MCCH containing the configuration for all the MBMS services and the header information for said service (step 22),
monitoring the configuration for the MBMS services (step 16) as in process A.

Process D comprises the following steps:
requesting by the user a particular MBMS service (e.g. a specific MBMS video program) (step 2) as in process B,
configuring the reception module of the UE for said particular MBMS service (step 6) in process B,
buffering received MBMS services (step 8) in process B,
displaying the buffered MBMS services (step 10) in process B.

Figure 9:
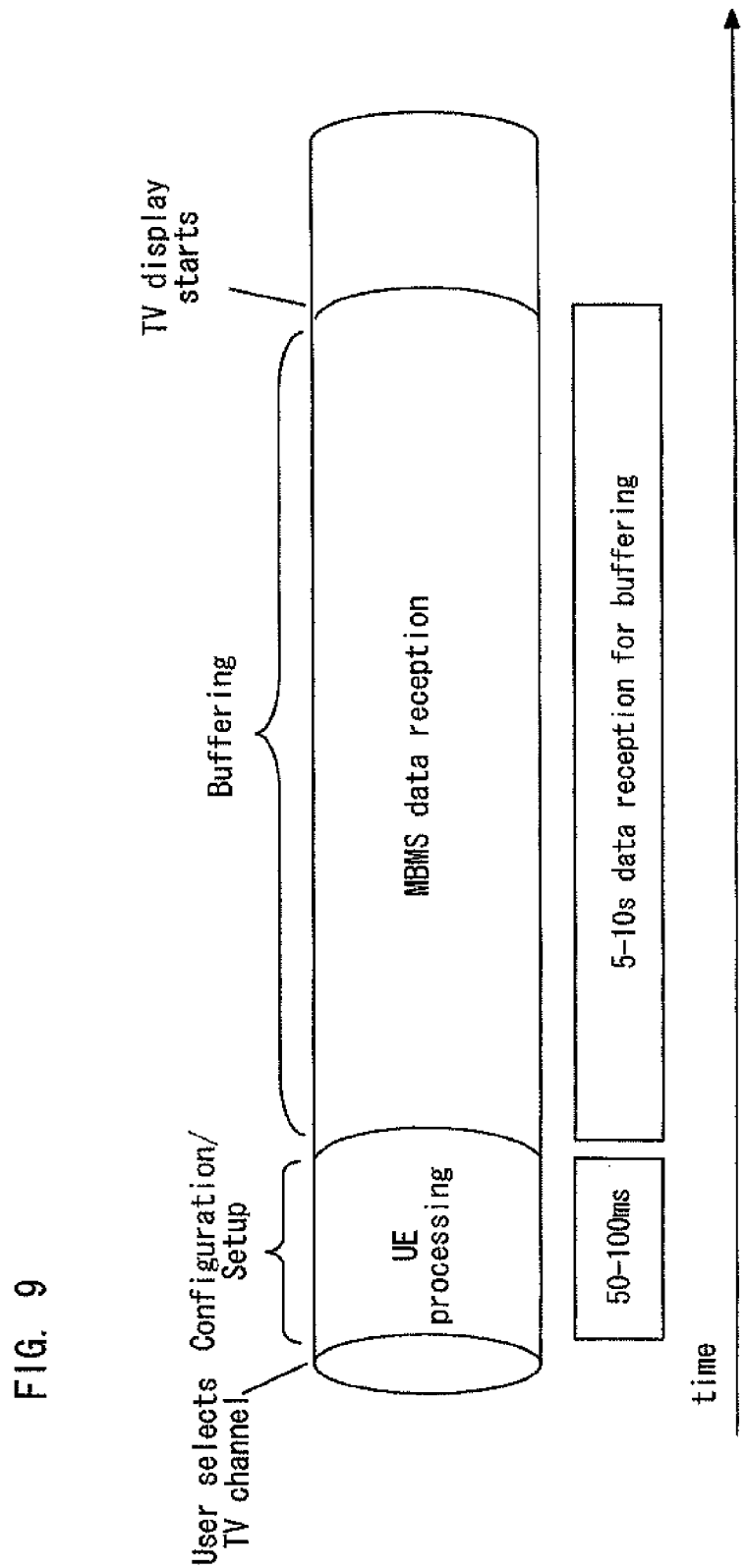

The total delay for these two processes until the displaying step of the requested MBMS service is illustrated by FIG. 9 where it can be seen that, before the MBMS data reception, the configuration of the UE take 50 ms to 100 ms, and at the MBMS data reception step, the buffering step takes 5 ms to 10 ms.

Figure 10:
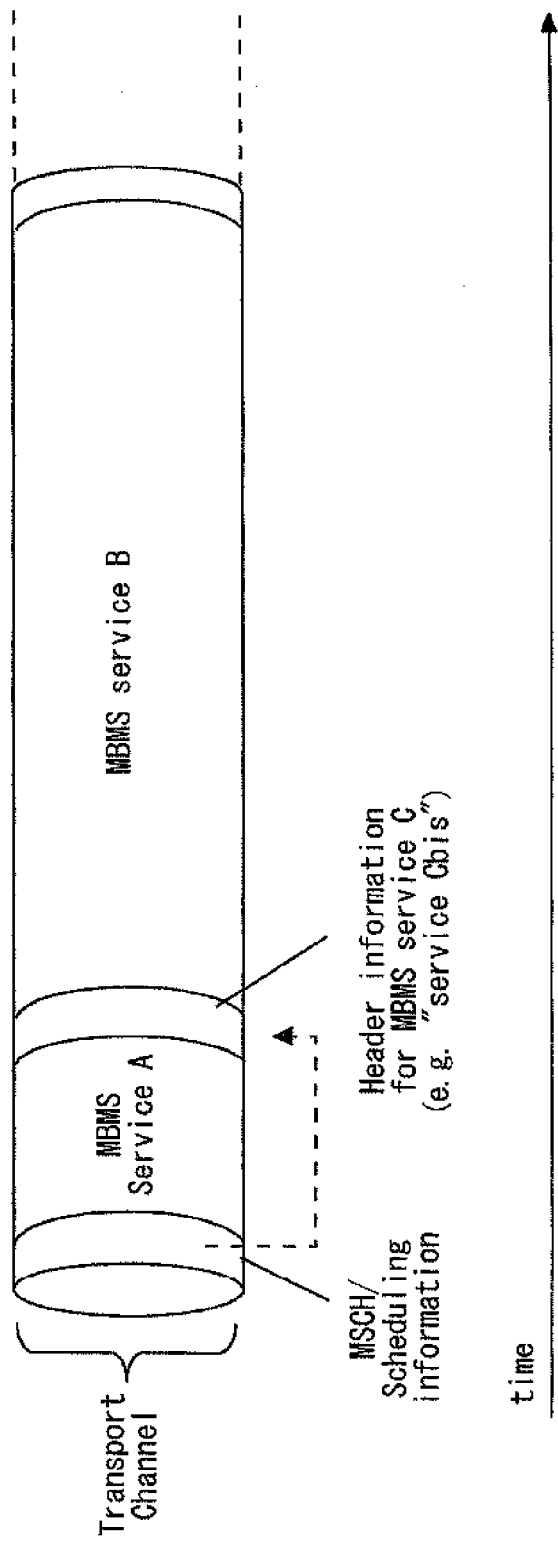
FIG. 10 is a particular embodiment of the invention.

FIG. 10 illustrates an embodiment of the invention according to which the header information is transmitted over a Transport Channel as a separate MBMS services, which is time multiplexed with the other MBMS services. The scheduling information (also called "MSCH") is included, that indicates where header information are transmitted for a particular MBMS service.

The invention claimed is:

1. A method for accelerating the activation of a MBMS (Multimedia Broadcast Multicast Service) service distributed by a service provider to a user equipment UE in the form of MBMS data packets, each MBMS data packet comprising compressed header information and a payload, the method comprising:
receiving, by the UE, a specific MBMS service data flow containing only header information;
receiving, by the UE, the specific MBMS service data flow separately from the MBMS data packets, the specific MBMS service data flow being received by the UE over one of a MBMS traffic channel (MTCH) and a MBMS control channel (MCCH) wherein the UE continuously reads the specific MBMS service data flow on one of the MTCH and the MCCH for header information of a set of MBMS services.

2. The method according to claim 1 wherein the specific MBMS service data flow is received by the UE with scheduling information indicating occurrence data of next transmissions of a service on MTCH in order to stop reception in-between.

3. The method according to claim 1 wherein the specific MBMS service data flow is received by the UE with reference periods of the MCCH for notifying a change of information related to a specific MBMS service data flow compared with a previous reference period.

4. The method according to claim 3 wherein the notification of the change of the information related to a specific MBMS service data flow is carried out by means of an MBMS indicator channel (MICH) monitored by the UE.

5. The method according to claim 3 wherein the notification of the change of the information related to a specific MBMS service data flow is carried out by means of an arrangement of MBMS control information on MCCH where control information is transmitted as the start of each reference period and includes a list of MBMS services for which modified information will be transmitted.

6. The method according to claim 1 wherein the specific MBMS service data flow is identified by means of MCCH control information related to the MBMS service containing the payload.

7. A User Equipment adapted for receiving MBMS service distributed by a service provider in the form of MBMS data packets comprising: compressed header information and a payload, said User Equipment comprising:
a reception unit that receives specific MBMS service data flow containing only header information transmitted separately over one of a MBMS traffic channel (MTCH) and a MBMS control channel (MCCH) from said MBMS data packets, wherein the UE continuously reads the specific MBMS service data flow on one of the MTCH and the MCCH for header information of an MBMS service.

8. The User Equipment according to claim 7 configured for acquiring and maintaining the header information for several MBMS services while not receiving said MBMS services.

\* \* \* \* \*